United States Patent [19]

Plewes et al.

Best Available Copy

[11] E Re. 30,854

[45] Reissued Jan. 26, 1982

[54] FREE MACHINING CU—NI—SN ALLOYS

[75] Inventors: John T. Plewes, Berkeley Heights; Philip R. White, Murray Hill, both of N.J.

[73] Assignee: Bell Telephone Laboratories, Incorporated, Murray Hill, N.J.

[21] Appl. No.: 189,379

[22] Filed: Sep. 22, 1980

Related U.S. Patent Documents

Reissue of:

[64] Patent No.: 4,130,421
Issued: Dec. 19, 1978
Appl. No.: 866,023
Filed: Dec. 30, 1977

[51] Int. Cl.[3] ..... C22C 9/06; C22C 9/02

[52] U.S. Cl. ..... 75/154; 75/159; 75/161; 148/12.7 C; 148/32; 148/32.5; 148/11.5 C

[58] Field of Search ..... 148/12.7 C, 32, 32.5; 75/154, 159, 153, 161; 148/11.5 C

[56] References Cited

U.S. PATENT DOCUMENTS

| | | | |
|---|---|---|---|
| 1,816,509 | 7/1931 | Wise | 75/154 |
| 2,117,106 | 5/1938 | Silliman | 75/154 |
| 3,940,290 | 2/1976 | Pryor et al. | 148/12.7 C |
| 4,012,240 | 3/1977 | Hinrichsen et al. | 148/12.7 C |
| 4,046,596 | 9/1977 | Metcalfe et al. | 148/12.7 C |

FOREIGN PATENT DOCUMENTS 466675 6/1937 United Kingdom .

*Primary Examiner*—W. Stallard
*Attorney, Agent, or Firm*—Peter A. Businger

[57] ABSTRACT

Cu-Ni-Sn alloys are disclosed which are particularly suited to undergo shaping by machining such as drilling, and lathing. In addition to Cu, Ni, and Sn, these alloys contain specified small amounts of Te, Se, Pb, or MnS. When articles are formed by machining of alloys having such specified composition, clogging of the machining tool and overheating of workpiece and machining tool are effectively prevented.

16 Claims, No Drawings

FREE MACHINING CU—NI—SN ALLOYS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention is concerned with copper based alloys.

2. Description of the Prior Art

Cu-Ni-Sn alloys have received considerable attention in connection with the manufacture of articles which may be shaped as cast, as hot worked, or as cold worked. For example, E. M. Wise and J. T. Eash, "Strength and Aging Characteristics of the Nickel Bronzes," Trans. AIME, Institute of Metals Division, Vol. 111, pages 218–243 (1934), and T. E. Kihlgren, "Production and Properties of Age Hardenable Five Percent Nickel-Bronze Castings," Trans. AFA, Vol. 46, pages 41–64, (1938), disclose Cu-Ni-Sn alloys which are strong and hard and which are suitable for certain casting applications. More recently, Cu-Ni-Sn alloys have been developed which are strong and ductile and which are suitable in the manufacture of electrical wire, wire connectors, and springs. Specifically, U.S. Pat. No. 3,937,638, "Method for Treating Copper-Nickel-Tin Alloy Compositions and Products Produced Therefrom," issued to J. T. Plewes on Feb. 10, 1976, discloses articles which are processed by homogenizing, substantial amounts of cold working such as drawing, rolling, or swaging, and aging by an amount which is dependent on the specific amount of cold work used. In contrast to the alloys disclosed by Eash and Wise, these more recently developed alloys exhibit predominantly a spinodal structure and attendant high levels of strength and ductility.

U.S. Pat. No. 4,052,204, "Quaternary Spinodal Copper Alloys," issued to J. T. Plewes on Oct. 4, 1977, discloses copper based spinodal alloys which are processed in a fashion similar to the alloys disclosed in U.S. Pat. No. 3,937,638, but which contain not only Cu, Ni, and Sn but also Fe, Zn, Mn, Zr, Nb, Cr, Al, or Mg in amounts within specified limits. Allowed U.S. application Ser. No. 685,262, filed by J. T. Plewes on May 11, 1976, discloses copper based spinodal alloys having compositions similar to the composition of alloys disclosed in U.S. Pat. Nos. 3,937,638, and 4,052,204, but which are cold rolled by amounts in the range of from 25–45 percent so as to achieve essentially isotropic formability in the rolled product. Resulting strip material is particularly suited for applications which require sharp bending such as in the manufacture of clips and electrical connectors.

U.S. patent application Ser. No. 838,141, filed by J. T. Plewes on Sept. 30, 1977, discloses spinodal Cu-Ni-Sn alloys containing prescribed amounts of Mo, Nb, Ta, V, or Fe and which are suitable for applications in which articles are shaped by hot working such as forging, extruding, or hot pressing or in which articles are shaped as cast.

A specific application of Cu-Ni-Sn alloys which are strong and hard is disclosed, e.g., in U.S. Pat. No. 3,817,487, "Cast Mold of Cu-Sn-Ni Alloy," issued to J. H. Bateman on June 18, 1974, in which their use for molding plastic articles is disclosed. A different application of Cu-Ni-Sn alloys is disclosed in U.S. Pat. No. 4,046,596, "Process for Producing Spectacle Frames Using an Age-Hardenable Nickel-Bronze Alloy," issued to R. T. Metcalfe et al., on Sept. 6, 1977, which discloses the use of such alloys in cold-drawn eyeglass frames.

As evidenced by the above-cited references, Cu-Ni-Sn alloys have proved to be suitable for the manufacture of articles shaped by working or shaped as cast. It has been realized, however, that alloys as disclosed are less suited for shaping by machining such as, e.g., in the manufacture of nuts, bolts, and slotted tubes from rod stock by drilling, lathing, or milling. Among undesirable effects observed during machining of such alloys are clogging of drill bits, overheating of machining tools and workpiece, and the formation of continuous strands of machined material which may get entangled with a rotating machining tool or workpiece.

SUMMARY OF THE INVENTION

It has been discovered that Cu-Ni-Sn alloys containing Se or Te in an amount of 0.1–0.5 weight percent, Pb in an amount of 0.1–0.2 weight percent, or MnS in an amount of 0.2–2.0 weight percent, are well suited to undergo shaping by machining. Specifically, when such alloys are shaped by drilling, lathing, or milling, the machining tool and workpiece remain unobstructed by machined material and their temperature remains at acceptable levels.

DETAILED DESCRIPTION

The preparation of Cu-Ni-Sn alloys containing small amounts of Te, Se, Pb, or MnS for the purpose of producing a free machining alloy may proceed, e.g., in a straigntforward fashion by casting from a melt in which constituent elements are present in desired proportion. Preparation of the melt, however, may require special care to ensure uniform distribution of additives Te, Se, Pb, or MnS, and, in the case of MnS, to ensure a ratio of Mn:S in the melt which should lie in the range of from 3:1 to 7:1 and preferably in the range of 5:1 to 6:1. Such proportions in which Mn is present in excess of the stoichiometric amount are indicated to ensure essentially complete tying up of sulfur whose presence in elemental form causes embrittling of the alloy. An exemplary procedure for preparing a melt is as follows:

Cu and Ni or a Cu-Ni alloy are melted in air at a temperature in the vicinity of 1300° C. To reduce oxygen content a cover of dry graphite chips is placed on the melt and, to prevent an increase of hydrogen content, an inert gas such as argon is bubbled through the melt for a period of about one-half hour. Sn is added while bubbling of the inert gas is maintained and S is added in the form of a low melting master alloy such as a eutectic with Cu, Ni, or Sn. The temperature of the resulting melt is reduced to the vicinity of 1250° C. at which point Mn is introduced into the melt by adding Mn or an Mn master alloy. It is also beneficial at this point to plunge a small amount of Mg or Mg master alloy into the melt as a deoxidant, amounts of Mg in a suggested range of 0.05–0.1 percent being generally adequate for such purpose. Alloys should preferably contain constituent elements Cu, Ni, Sn, and Te, Se, Pb, or MnS in a combined amount of at least 90 weight percent. In general, and especially if subsequent development of a spinodal structure is desired, Ni should preferably be present in an amount of from 3–10 weight percent and Sn in an amount of 3–10 weight percent at three percent Ni and 3–12 weight percent at 30 percent Ni. Preferred limits for Sn contents at intermediate levels of Ni may be obtained by linear interpolation between levels specified at three and 30 percent Ni. Additives Te, Pb, Se, or MnS should preferably be present in amounts within weight percent ranges shown in Table 1.

TABLE 1

| | Range | Preferred Range |
|---|---|---|
| Se | 0.1–0.5 | 0.15–0.2 |
| Te | 0.1–0.5 | 0.15–0.2 |
| Pb | 0.1–0.2 | 0.11–0.15 |
| MnS | 0.2–2.0 | 0.5–1.5. |

Limits shown in Table 1 were determined by observing the shape of chips lathed from rods which were up-cast from melts containing Cu, Ni, Sn and Te, Pb, or MnS rods were lathed as cast, after solution annealing, and after solution annealing plus cold working.

Desirable amounts of Te, Pb, and MnS were found to be essentially independent of Ni and Sn contents of the alloy and of thermomechanical treatment prior to machining. Amounts below those of the lower limit of the ranges shown in Table 1 were determined not to sufficiently enhance machinability and amounts in excess of those of the upper limit are unnecessary for such purpose. Moreover, the presence of excessive amounts of Se or Te tends to cause hot shortness of the alloy, i.e., to cause cracking or splitting of a workpiece during hot or warm working. The presence of Pb also tends to produce hot shortness and, moreover, to embrittle the alloy upon subsequent low temperature aging as may be used to develop a spinodal structure. Consequently, the use of Se, Te, or Pb is preferably restricted to castings and, in the case of Pb, to applications which do not require high levels of ductility. The use of MnS is preferred in alloys which are to be shaped by hot working, warm working, or cold working and, in particular, in alloys in which a spinodal structure is to be developed. A further advantage of MnS lies in its safety and nontoxicity.

Preferred upper limits on the presence of elements which may be tolerated in the alloy in a combined amount of not exceeding ten weight percent and which may be added for purposes such as grain refinement or to enhance ductility or strength are as follows: 0.1 percent Mo, 0.35 percent Nb, 0.3 percent Ta, 0.5 percent V, 7 percent Fe, one percent mg, 5 percent Mn, 10 percent Zn, 0.2 percent Zr, one percent Cr. Preferred upper limits on the presence of impurities such as may be present in commercially available alloys are as follows: 0.2 percent Co, 0.1 percent Al, 0.01 percent P, 0.05 percent Si. In the presence of refractory elements Mo, Nb, Ta, or V, oxygen contents of the alloys should be kept below 100 ppm to minimize the formation of refractory metal oxides.

To the cast ingot a variety of thermal and thermomechanical treatments may be applied as disclosed, e.g., in U.S. Pat. Nos. 3,937,638, and 4,012,140 and allowed application Ser. No. 685,262. For example, a cast ingot may be homogenized, cold worked, and aged by appropriate amounts to develop a spinodal structure. Moreover, cold working and aging may be carried out in a duplexing fashion by alternate aging and cold working in the interest of achieving high ultimate strength. However, thermo-mechanical processing is not a requirement, and in fact, castings having a composition as disclosed above may be machined readily.

In addition to lathing of alloys to determine preferred amounts of Se, Te, Pb, and MnS as mentioned above, alloys containing MnS as described in the following example were also drilled.

EXAMPLE

Melts containing nine percent Ni, seven percent Sn, and MnS in amounts of 0, 0.5, 1, and 2 percent were prepared by the method described above. The four melts were cast at a temperature of 1200° C., warm worked at 650° C. by an amount of 50 percent area reduction, homogenized at 825° C., cold worked by rolling, and aged. A first set of four samples was aged for 15 minutes at 400° C. to develop a near optimal spinodal structure, and a second set of four samples was over-aged for 45 minutes at 400° C. Yield strength, tensile strength, and area reduction at fracture were experimentally determined. For the first set of samples, 0.01 yield strengths of approximately 134,000 psi, tensile strengths of approximately 162,000–165.000 psi, and area reductions of 28–48 percent were measured. For the second set of samples corresponding values of 127,000–130,000 psi, 147,000–161,000 psi, and 28–44 percent were measured. What is considered remarkable is the fact that strength and ductility of these alloys is essentially independent of the presence of the additive MnS. In contrast to such uniformity of strength and ductility, machinability was found to be strongly dependent on the presence of the additive. Such dependence was confirmed by drilling 0.5 inch deep holes into the samples, using a 0.02 inch drill at 1800 RPM and with a 0.25 inch per minute feed. While drilling of samples not containing MnS yielded continuous strands of removed material, drilling, of samples containing MnS produced small chips of removed material. Chips having a length of the order of 1 mm were obtained with samples containing 1 percent MnS as well as with samples containing 2 percent MnS.

What is claimed is:

1. Article of manufacture comprising a copper based alloy which is shaped by machining, an aggregate amount of at least 90 weight percent of said alloy consisting of Cu, Ni, Sn, and at least one additive, said aggregate amount having a Ni content in the range of three weight percent to 30 weight percent, said aggregate amount having a Sn content in a range of three weight percent to an upper limit which is a linear function of said Ni content, said upper limit being ten weight percent when said Ni content is three weight percent and said upper limit being 12 weight percent when said Ni content is 30 weight percent, and CHARACTERIZED IN THAT said additive is [selected from the group consisting of Se in the range of 0.1–0.5 weight percent of said aggregate amount, Te in the range of 0.1–0.5 weight percent of said aggregate amount, Pb in the range of 0.1–0.2 weight percent of said aggregate amount, and] MnS in the range of 0.2–2.0 weight percent of said aggregate amount.

2. Article of claim 1 in which said additive is [selected from the group consisting of Se in the range of 0.15–0.2 weight percent of said aggregate amount, Te in the range of 0.15–0.2 weight percent of said aggregate amount, Pb in the range of 0.11–0.15 weight percent of said aggregate amount, and] MnS in the range of 0.5–1.5 weight percent of said aggregate amount.

3. Article of claim 1 in which not more than 0.1 weight percent of said alloy is Mo, not more than 0.35 weight percent of said alloy is Nb, not more than 0.3 weight percent of said alloy is Ta, not more than 0.5 weight percent of said alloy is V, not more than 7 weight percent of said alloy is Fe, not more than 1 weight percent of said alloy is Mg, not more than 5 weight percent of said alloy is Mn, not more than 10 weight percent of said alloy is Zn, not more than 0.2 weight percent of said alloy is Zr, and not more than 1 weight percent of said alloy is Cr.

4. Article of claim 1 in which not more than 0.2 weight percent of said alloy is Co, not more than 0.1 weight percent of said alloy is Al, not more than 0.01 weight percent of said alloy is P, and not more than 0.05 weight percent of said alloy is Si.

5. Article of claim 1 in which said alloy prior to machining is hot worked, warm worked, or cold worked, and in which said additive is MnS.

6. Article of claim 1 in which a predominantly spinodal structure is developed in said alloy [and in which said additive is MnS].

7. Article of claim 6 in which said spinodal structure is developed by homogenizing, cold working, and aging.

8. Article of claim 6 in which said alloy contains Mo, Nb, Ta, V, or Fe and in which said spinodal structure is developed by aging.

9. Article of claim 1 in which the ratio of Mn:S is in the range of 3:1 to 7:1.

10. Article of claim 9 in which said ratio is in the range of 5:1 to 6:1.

11. Copper based alloy of which an aggregate amount of at least 90 weight percent consists of Cu, Ni, Sn, and at least one additive, said aggregate amount having a Ni content in the range of three weight percent to 30 weight percent, said aggregate amount having a Sn content in a range of three weight percent to an upper limit which is a linear function of said Ni content, said upper limit being ten weight percent when said Ni content is three weight percent and said upper limit being 12 weight percent when said Ni content is 30 weight percent, and CHARACTERIZED IN THAT said additive is [selected from the group consisting of Se in the range of 0.1–0.5 weight percent of said aggregate amount, Te in the range of 0.1–0.5 weight percent of said aggregate amount, Pb in the range of 0.1–0.2 weight percent of said aggregate amount, and] MnS in the range of 0.2–2.0 weight percent of said aggregate amount.

12. Alloy of claim 11 in which said additive is [selected from the group consisting of Se in the range of 0.15–0.2 weight percent of said aggregate amount, Te in the range of 0.15–0.2 weight percent of said aggregate amount, Pb in the range of 0.11–0.15 weight percent of said aggregate amount, and] MnS in the range of 0.5–1.5 weight percent of said aggregate amount.

13. Alloy of claim 11 containing not more than 0.1 weight percent Mo, not more than 0.35 weight percent Nb, not more than 0.3 weight percent Ta, not more than 0.5 weight percent V, not more than 7 weight percent Fe, not more than one weight percent Mg, not more than 5 weight percent Mn, not more than 10 weight percent Zn, not more than 0.2 weight percent Zr, and not more than 1 weight percent Cr.

14. Alloy of claim 11 containing not more than 0.2 weight percent Co, not more than 0.1 weight percent Al, not more than 0.01 weight percent P, and not more than 0.05 weight percent Si.

15. Alloy of claim 11 in which the ratio of Mn:S is in the range of 3:1 to 7:1.

16. Alloy of claim 15 in which said ratio is in the range of 5:1 to 6:1.

* * * * *